United States Patent
Tepper et al.

(10) Patent No.: US 7,135,134 B2
(45) Date of Patent: Nov. 14, 2006

(54) METHOD FOR FORMING MICROSCOPIC POLYMER INTERCONNECTIONS

(75) Inventors: Gary Tepper, Glen Allen, VA (US); Royal Kessick, Richmond, VA (US)

(73) Assignee: Virginia Commonwealth University, Richmond, VA (US)

(*) Notice: Subject to any disclaimer, the term of this patent is extended or adjusted under 35 U.S.C. 154(b) by 244 days.

(21) Appl. No.: 10/777,783

(22) Filed: Feb. 13, 2004

(65) Prior Publication Data

US 2004/0219578 A1 Nov. 4, 2004

Related U.S. Application Data

(60) Provisional application No. 60/447,733, filed on Feb. 19, 2003.

(51) Int. Cl.
*B29B 9/06* (2006.01)
(52) U.S. Cl. .......................... 264/10; 264/484
(58) Field of Classification Search .................... None
See application file for complete search history.

(56) References Cited

U.S. PATENT DOCUMENTS 6,315,806 B1 * 11/2001 Torobin et al. ............... 55/522

2002/0090725 A1 * 7/2002 Simpson et al. ............. 435/402
2003/0137083 A1 * 7/2003 Ko et al. ..................... 264/449
2003/0195611 A1 * 10/2003 Greenhalgh et al. ........ 623/1.15

* cited by examiner

*Primary Examiner*—Mary Lynn Theisen
(74) *Attorney, Agent, or Firm*—Whitham, Curtis, Christofferson & Cook, PC

(57) ABSTRACT

Polymer fiber interconnects are produced between microscale features on substrate using only electrostatic forces. In one embodiment, electric field driven directed growth of fibers is achieved between microscale droplets of a concentrated polymer solution deposited on a substrate associated with a capacitor, such as an interdigitated capacitor. After depositing the droplets, the droplets on or near the positive electrode become positively charged and the droplets on or near the negative electode become negatively charged. Fibers form between the positively and negatively charged droplets due to electrostatic forces. In a second embodiment, positively charged and negatively droplets are created by electrospraying or by other means, and the fibers spontaneously form between droplets of opposite polarity. The process is similar to conventional electrospinning, but is achieved on a micrscopic scale and utilizes significantly lower driving potentials.

11 Claims, 2 Drawing Sheets

US 7,135,134 B2

METHOD FOR FORMING MICROSCOPIC POLYMER INTERCONNECTIONS

CROSS REFERENCE TO RELATED APPLICATIONS

This application is related to U.S. Provisional Patent Application 60/447,733 filed Feb. 19, 2003, and the complete contents of that application is herein incorporated by reference.

DESCRIPTION

BACKGROUND OF THE INVENTION

1. Field of the Invention

The present invention generally relates to fiber formation by electrospinning and, more particularly, to a new technique for the formation of polymeric fiber interconnections in very small (e.g., microscale or nanoscale) systems.

2. Background Description

Polymer fibers form the basis of a wide variety of industries ranging from breathable, weather-resistant, and bulletproof garments to telecommunications, structural engineering, and medicine. Polymer fibers are conventionally created by extruding a polymer melt through a spinneret and subsequently drawing the fibers as they coagulate. However, it is difficult to produce submicron diameter fibers using this conventional process and many emerging opportunities exist for high performance nanoscale materials and devices.

The recent focus on nanoscale engineering has revived interest in a radically different fiber formation technology known as electrospinning, wherein a polymer fiber is drawn from a solution using electrostatic instead of mechanical forces. The basic advantage of the electrospinning fiber formation process is that extremely small diameter, nanoscale fibers can be produced from a wide variety of polymer solutions (see, for example, Kenawy et al., *Biomaterials* 24:907 (2003); Deitzel et al, *Polymer,* 42:8163 (2001); and Reneker et al, *Nanotechnology* 7:216 (2000)). The theoretical model for the electrospinning process has evolved over time and the fiber formation mechanisms have been described in several recent articles (se, for example, Deitzel et al., *Polymer* 42:261 (2001); Yarin et al., *J. App. Phys.* 90:4836 (2001); and Shin et al., *Polymer,* 42:9955 (2001)). Typically, an electrospinning apparatus consists of a hypodermic syringe or needle filled with a polymer solution and placed at a high (approximately 15 kV) potential with respect to a ground plane. The sharp tip of the needle concentrates the electrostatic force and fibers emerge from the tip of a Taylor cone formed at the surface of the solution through a competition between electrostatic forces and surface tension. The fibers are collected at the counter electrode and typical electrospun structures consist of a nonwoven mat of fine fibers.

SUMMARY OF THE INVENTION

It is therefore an object of the present invention to provide a new method of making polymeric microfiber interconnections which does not require complex chemistry or mechanical devices.

The physical laws of electrostatics that drive the conventional electrospinning fiber formation process are quite general. We demonstrate herein that the entire process can be scaled to achieve directed nanoscale polymer fiber growth on the surface of a microchip without the need for high voltage, pumps, or needles. In fact, the fiber formation process appears to be favored at reduced dimensions due to electric field concentration effects. Thus, it will be possible, using this invention, to produce controlled nanoscale polymer fiber structures and interconnections directly on the surface of a chip for numerous applications including, without limitation, intrachip optical interconnections for the computer industry, chip-scale biocompatible fiber-based scaffolds, and highly sensitive microsensors.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
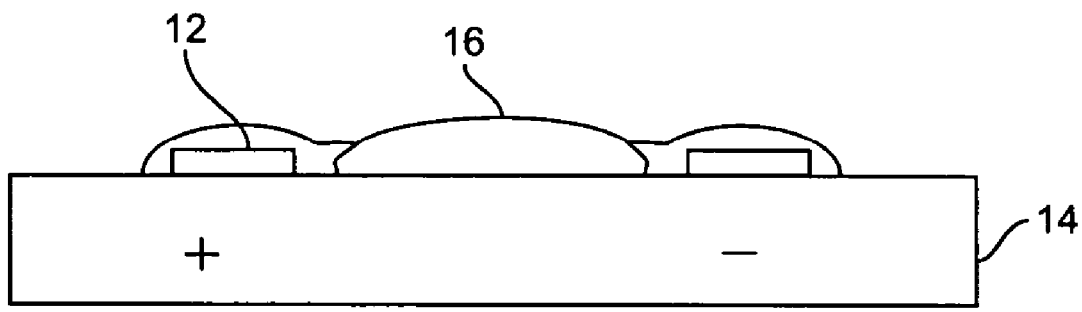
FIGS. 1a–b are schematic side and top view diagrams, respectively, illustrating fiber formation between neutral droplets on oppositely charged electrodes.
Figure 1B:
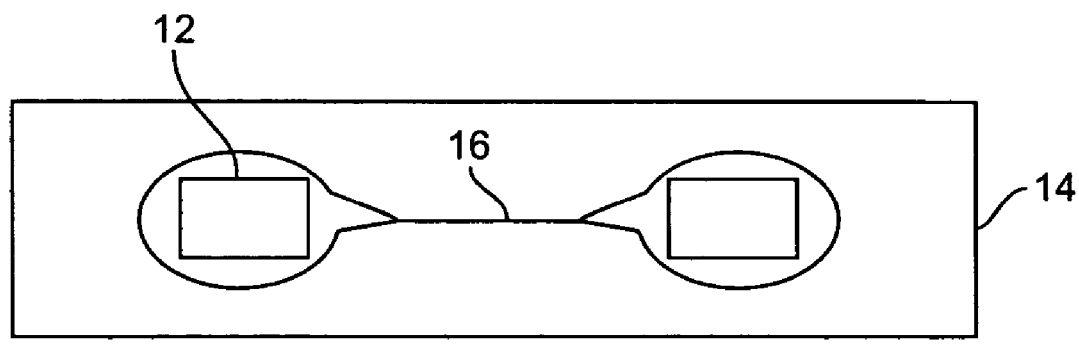
Figure 1C:
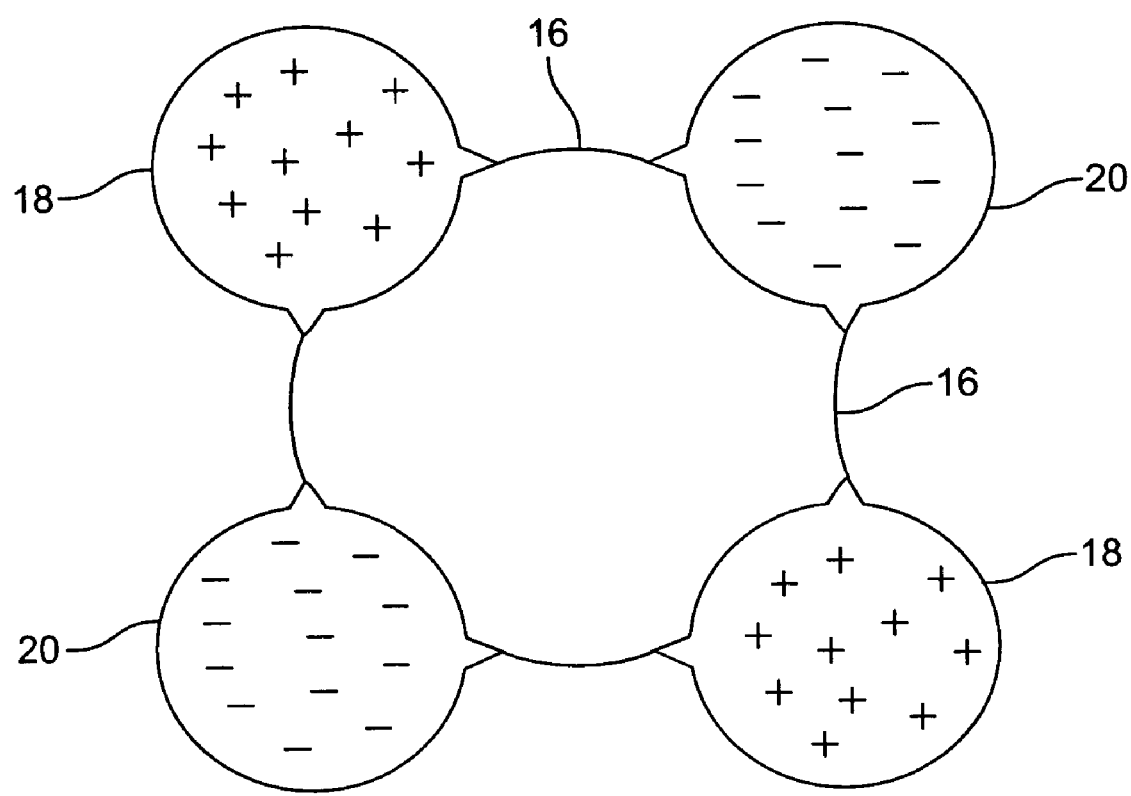
FIG. 1c is an illustration of fiber formation between oppositely charged droplets applied to an insulating surface using electrospray ionization.

The invention of forming polymer fiber interconnections is best understood by two related embodiments, both of which have been demonstrated experimentally. In the first method, illustrated in FIGS. 1a and 1b, a polymer 10 was dissolved in a solvent and neutral, microscale droplets were airbrushed onto the surface of an interdigitated metal electrode 12 on a glass substrate 14. A potential difference was applied between the electrodes and fibers 16 were observed to form between droplets on alternating electrodes. In the second method, illustrated in FIG. 1c, positively and negatively charged droplets 18 and 20, respectively, were alternately sprayed onto an insulating substrate using electrospray ionization. This can be done by a number of means as discussed, for example, in Dole, *J. Chem. Phys.* 49:2240 (1968); Iribarne et al., *J. Chem. Phys.* 64:2287 (1976); and Yamashita et al. *J. Phys. Chem.* 88:4451 (1984). In the experiments discussed herein, the change in droplet polarity was achieved by switching the polarity of the high voltage power supply used to drive the electrospray process. In this case, nanoscale fibers were observed to form spontaneously between oppositely charged droplets without the need for the application of an external potential.

Atomic force microscopy (AFM) images were made of a typical sub-micron diameter carboxymethylcellulose (CMC) fiber produced using the method of the first embodiment described above. In the experiment, two metal electrodes separated by 15 µm on the surface of a glass substrate. The CMC was first dissolved in a water/methanol solution at a concentration of 0.2 wt %. The solution was then airbrushed onto the electrode in the form of microscale droplets. The concentration of the polymer in the droplets on the surface is expected to be greater than the original solution concentration due to solvent evaporation. A potential difference of 6 V was immediately applied between the interdigitated metal electrodes before complete evaporation of the liquid solvent. Due to the small spacing between the electrodes, this voltage difference produces an electric field magnitude on the order of 4 kV/cm, which is typical of the fields used in the conventional, macroscale electrospinning process. AFM images were obtained and compared to images from control samples produced in an identical process, but without an applied voltage. While numerous fibers were observed on the samples to which a voltage had been applied, no fibers could be found on the samples for which no external voltage was applied. Once established and upon removal of the potential difference, the dry, solvent-free polymer fibers were found to be mechanically stable and remained intact on the surface of the micro electrode.

Similar experiments were conducted and fibers were made using the method of the second embodiment set forth above. Scanning Electron Microscopy (SEM) images were obtained showing a single 100 nm diameter CMC fiber connecting to oppositely charged droplets each of which were approximately 2 µm in diameter. In addition, SEM images showed a single droplet with at least six individual fibers emerging from various locations around the circumference and connecting two oppositely charged droplets. In these experiments, CMC was dissolved in a water/methanol solution at a concentration of 0.01 wt %. Positively charged droplets were electrosprayed onto the polycarbonate substrate by applying a positive potential of 7.5 kV to the electrospray needle with respect to a ground plane established behind the substrate. Negatively charged droplets were applied to the polycarbonate substrate in the same manor by switching the power supply polarity. SEM and AFM images were obtained and compared to samples coated with both neutral droplets from airbrushing and single polarity droplets from electrospray. Fibers were only observed on the polycarbonate substrates coated with oppositely charged droplets.

The results observed essentially provide for polymer electrospinning at microscopic dimensions and can allow for the production of nanoscale polymer fibers, interconnections, and scaffolds on the surface of, for example, a microchip. The fiber formation process is very simple and fast, does not require any special materials, chemistry, or equipment, and can be applied to a wide variety of materials such as conducting, electroactive, photonic, and biocompatible polymers. The images observed by SEM exhibit specific microscale features that are characteristic of an electric field driven fiber formation process. For example, each nanoscale fiber emerges from a small conical structure protruding from the surface of the droplet, which appears to be analogous to a Taylor cone. The cones are formed from a competition between the electrostatic forces and surface tension at a time before the solvent has completely evaporated. As the solvent continues to evaporate the viscosity of the droplet increases, preserving the electric field induced microstructure which was observed.

It should be understood that the process is applicable to a number of different polymers and would be readily applicable to materials such as conducting and biocompatible polymers (such as, for example, polyaniline or polylacticacid) and even polymer composites (such as, for example, polymers containing carbon nanotubes or metallic nanoparticles) and mixtures (such as, for example, polymer blends or polymers combined with inorganics). In either embodiment, the positively and negatively charged drops could include the same or different polymers, as well as mixtures of polymers. A number of solvents could be used within the practice of the invention including, for example, water, organic solvents, alcohols or acids. The chief requirement is that the polymer is dissolved in a liquid solvent. In the practice of the invention, the solution of polymer and solvent is applied to material(s) or device(s) to be connected. Example materials or devices include the components or devices in an electrical circuit, microchip, biochip, or other organic or inorganic materials. The volume of the drops can vary between picoliters and microliters, and will depend on the application and the length of fiber to be produced. Likewise, the spacing between the positively and negatively charged droplets can vary depending on the application, and will typically be between 1 micron and 50 microns. The solution application method can vary and would depend on the nature of the components to be connected. Examples of application methods include airbrushing, electrospraying, dipping, spinning, inkjet technology and direct application using a device such as a syringe.

As noted above, an electric field is created between the components to be connected. The electric field could be created directly by application of a potential difference as in the first embodiment. In this embodiment, the magnitude of the field can vary depending on the application, but will typically be between 100 V/cm and 10,000V/cm. Also, as in the second embodiment, the electric field can be present naturally if the solutions to be connected are oppositely charged. Polymer fiber interconnections will form between the components of opposite polarity when the electric field magnitude reaches a critical value. The critical magnitude of the electric filed will differ for different polymers, solvents, and solution concentrations. The interconnections can be formed between two or more solutions of opposite polarity or between one solution and another component of opposite polarity.

Potential applications include the creation of interconnections on microchips and biochips, the formation of sensors based on polymer nanowires and the formation of neural networks. The invention may also be used in the field of medicine in, for example, nerve generation using biocompatible polymers for the interconnections. Depending on the application, the polymer droplets could adhere to different portions of a substrate (e.g., to different components on the substrate) or to different substrates with one or more fibers interconnecting the droplets (thus interconnecting the two substrates or the two components on a substrate, for example). Alternatively, for some applications, it may be desirable to remove the fibers after fiber formation, and use them in an application of interest.

While the invention has been described in terms of its preferred embodiment, those skilled in the art will recognize that the invention can be practiced with modification within the spirit and scope of the appended claims.

Having thus described our invention, what we claim as new and desire to secure by Letters Patent is as follows:

1. A method of making microscopic polymeric fibrous interconnections, comprising the steps of:
  forming on a substrate positively charged and negatively charged droplets of one or more solutions each containing one or more polymers solubilized in one or more solvents, said positively charged and negatively charged droplets being spaced close enough together to have an electrostatic force created between one or more components of said positively charged and negatively charged droplets; and
  permitting fibers to form between said positively charged and said negatively charged droplets.

2. The method of claim 1 wherein said forming step is achieved using electrospray ionization of said one or more solutions.

3. The method of claim 1 wherein said substrate is an electronic chip or biochip.

4. The method of claim 1 wherein said permitting step allows more than one fiber to be formed from at least a plurality of said positively charged and negatively charged droplets.

5. The method of claim 1 further comprising the step of recovering fibers formed during said permitting step.

6. The method of claim 1 wherein said positively charged and negatively charged droplets include the same polymer.

7. The method of claim 1 wherein the positively charged and negatively charged droplets include the same solvent.

8. The method of claim 1 wherein said fibers range in length from 1 micron to 50 microns.

9. The method of claim 1 wherein the positively charged and negatively charged droplets have a volume ranging from picoliters to microliters.

10. The method of claim 1 wherein said forming step is performed by depositing droplets of said one or more solutions on said substrate, and applying electric field between at least two different regions of said substrate where droplets in said first of said two different regions become said positively charged droplets and where droplets in said second of said two different regions become negatively charged droplets.

11. The method of claim 10 wherein said substrate includes an interdigitated capacitor.

* * * * *